(12) United States Patent
Trizila et al.

(10) Patent No.: US 10,359,242 B2
(45) Date of Patent: Jul. 23, 2019

(54) METHOD AND APPARATUS FOR FLOW MALDISTRIBUTION CONTROL

(71) Applicant: HONEYWELL INTERNATIONAL INC., Morris Plains, NJ (US)

(72) Inventors: Patrick Trizila, Hermosa Beach, CA (US); Yogendra Yogi Sheoran, Scottsdale, AZ (US); Frank Lin, Torrance, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 370 days.

(21) Appl. No.: 14/959,717

(22) Filed: Dec. 4, 2015

(65) Prior Publication Data

US 2017/0160024 A1 Jun. 8, 2017

(51) Int. Cl.
| | |
|---|---|
| *F28F 27/00* | (2006.01) |
| *F28F 13/06* | (2006.01) |
| *F28F 27/02* | (2006.01) |
| *F24F 11/84* | (2018.01) |
| *F16K 47/08* | (2006.01) |

(52) U.S. Cl.
CPC ............. *F28F 27/00* (2013.01); *F16K 47/08* (2013.01); *F24F 11/84* (2018.01); *F28F 13/06* (2013.01); *F28F 27/02* (2013.01); *F28F 2220/00* (2013.01)

(58) Field of Classification Search
CPC .......... F02D 9/10; F02D 9/1005; F02D 9/101; F02D 9/1015; F02D 9/102; F02D 9/103; F02D 9/1035; F02D 9/104; F02D 9/1045; F28F 27/00; F28F 27/003; F28F 27/006; F28F 27/02; F28F 27/0209; F28F 27/0227; F28F 2220/00; F24F 11/81; F24F 11/84; F24F 13/10; F16K 47/08; F16K 47/10; F16K 47/12; F16K 47/14; F16K 47/16
USPC ............................ 251/127; 165/96, 98, 109.1
See application file for complete search history.

(56) References Cited

U.S. PATENT DOCUMENTS

| | | | | |
|---|---|---|---|---|
| 3,234,966 | A * | 2/1966 | Klose | ........................ F16K 1/22 |
| | | | | 137/513.7 |
| 4,333,441 | A * | 6/1982 | Still | ..................... F02M 23/001 |
| | | | | 123/590 |
| 4,462,358 | A | 7/1984 | Ishida et al. | |
| 4,691,894 | A * | 9/1987 | Pyotsia | .................. F16K 47/08 |
| | | | | 251/127 |

(Continued)

FOREIGN PATENT DOCUMENTS

| | | | | |
|---|---|---|---|---|
| DE | 102014110616 A1 * | 1/2016 | ............ F16K 1/226 |
| EP | 2175180 A1 | 4/2010 | | |

OTHER PUBLICATIONS

DE102014110616A1 machine translation.*

*Primary Examiner* — Ian G Paquette
(74) *Attorney, Agent, or Firm* — Shimokaji IP

(57) ABSTRACT

A flow control system in an inlet duct to a heat exchanger includes a door having a first end and a second end opposite the first end. The first end rotates about an axis and the second end moves between an open position and a closed position to respectively allow and prevent flow into the heat exchanger. The second end has a rounded configuration. A plurality of mixing elements are downstream of the door. At least one mixing element has a base portion and a distal portion, and the base portion has a base width and the distal portion has a distal width. The base width is wider that the distal width.

18 Claims, 8 Drawing Sheets

(56) References Cited

U.S. PATENT DOCUMENTS

| | | | | |
|---|---|---|---|---|
| 6,003,490 | A | * 12/1999 | Kihara | F02D 9/1015 |
| | | | | 123/337 |
| 6,367,772 | B1 | * 4/2002 | Glogovcsan, Jr. | F02D 9/02 |
| | | | | 251/123 |
| 7,090,575 | B2 | * 8/2006 | Ito | B60H 1/00678 |
| | | | | 251/314 |
| 8,226,068 | B2 | * 7/2012 | Azar | B60H 1/00678 |
| | | | | 251/314 |
| 2004/0149340 | A1 | 8/2004 | Steiner et al. | |

\* cited by examiner

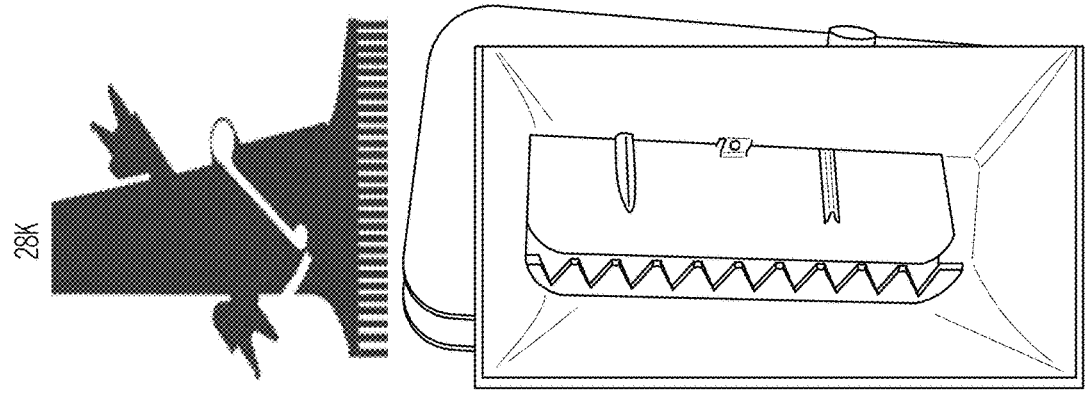
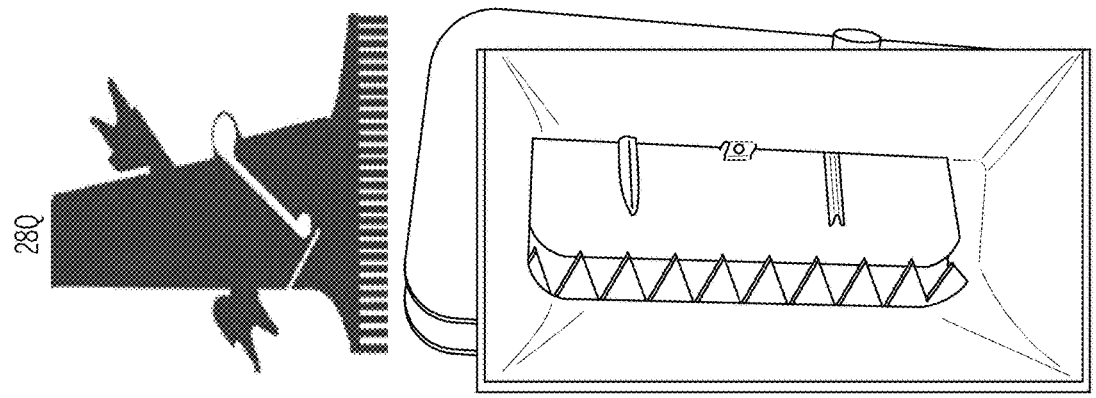

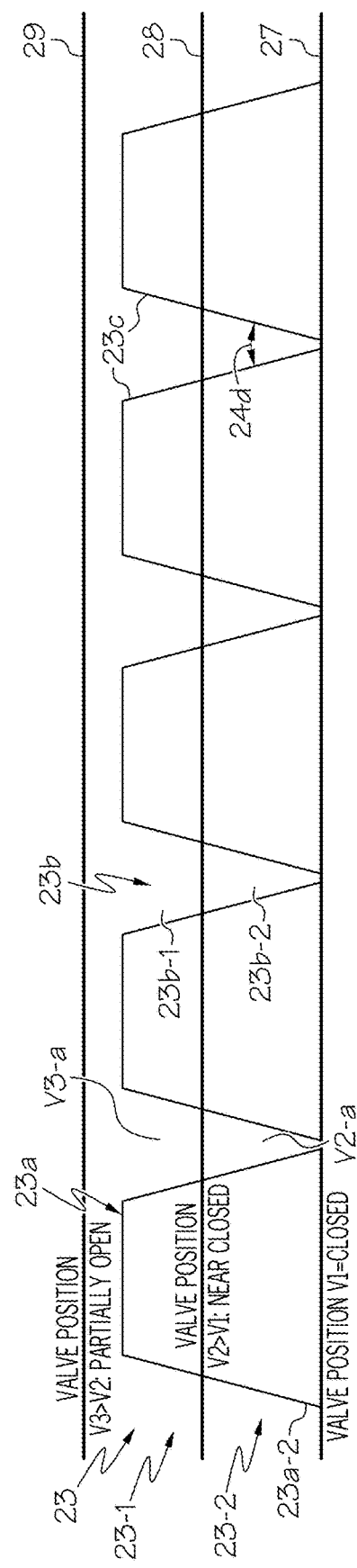

METHOD AND APPARATUS FOR FLOW MALDISTRIBUTION CONTROL

BACKGROUND OF THE INVENTION

The present invention generally relates to heat exchangers and, more particularly, to apparatus and methods of managing flow distribution into heat exchangers.

Heat exchanger life is driven by strain ranges and their location within the heat exchanger. These strain ranges are a function of the temperature gradients present, both spatial and temporal, as well as the heat exchanger design. The flow distribution into the heat exchanger is one factor driving the strain ranges and their location.

Current designs include a valve immediately upstream of the heat exchanger and which causes severe flow maldistribution. This, in turn, causes large spatial flow gradients, flow spikes locally that can exceed 10× uniform flow, and temporal flow gradients, as the valve opens and closes. The spatial gradients can also move to different locations on the heat exchanger entrance.

FIG. 1 is a plan view of a current design of a heat exchanger 10 and duct/manifold 11. A valve door 12 has a trailing edge 12a that, when nearly closed, allows a jetted flow 13 to enter the heat exchanger 10. This trailing edge design can cause large spatial flow gradients. It can also cause temporal gradients when the valve door moves 12 from one position to another. A large vortex 14 can also exist behind the valve door 12 and which can starve areas of the heat exchanger inlet 10a, such as in the area 15. FIG. 2 depicts, at the heat exchanger inlet, a flow distribution created by the design of FIG. 1.

As can be seen, there is a need for improved apparatus and methods to control flow maldistribution into a heat exchanger.

SUMMARY OF THE INVENTION

In one aspect of the present invention, a flow control system in an inlet duct to a heat exchanger comprises a door having a first end and a second end opposite the first end; wherein the first end rotates about an axis; wherein the second end moves between an open position and a closed position to respectively allow and prevent flow into the heat exchanger; wherein the second end has a rounded configuration; a plurality of mixing elements downstream of the door; wherein at least one mixing element has a base portion and a distal portion; wherein the base portion has a base width and the distal portion has a distal width; and wherein the base width is wider that the distal width.

In another aspect of the present invention, a flow control system in an inlet duct to a heat exchanger comprises a door having a downstream end where a flow in the inlet duct enters the heat exchanger wherein the downstream end moves between an open position and a closed position to respectively allow and prevent flow into the heat exchanger; wherein the downstream end has a smooth, rounded surface; wherein the downstream end decreases separation of the flow from the door; wherein the downstream end increases diffusion of the flow past the door; and a mixer downstream of the door; and wherein the mixer provides a non-lineally increasing flow area as the downstream end moves between the closed position and the open position.

In yet another aspect of the present invention, a flow control system in an inlet duct to a heat exchanger comprises a door having a downstream end where a flow in the inlet duct enters the heat exchanger; wherein the downstream end moves between an open position and a closed position to respectively allow and prevent flow into the heat exchanger; a mixer downstream of the door; wherein the mixer has a plurality of mixer openings through which the flow passes; wherein at least one mixer opening has a base portion and a distal portion; wherein the at least one mixer opening: provides a continuous increase in flow area from the base portion to the distal portion; decreases temporal flow gradients when the door is near the closed position; and decreases spatial flow gradients at an inlet of the heat exchanger.

These and other features, aspects and advantages of the present invention will become better understood with reference to the following drawings, description and claims.

BRIEF DESCRIPTION OF THE DRAWINGS

FIGS. 5A-5E depict alternate embodiments of a mixer of a flow control system according to the present invention;

FIG. 6 is a front view of a mixer of a flow control system according to the present invention;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Generally, the present invention provides a flow control system for a heat exchanger. The flow control system herein can be positioned in a duct leading to a heat exchanger, and include a rounded or non-sharp edge of a valve door and a mixer downstream of the valve door.

The present invention can decrease or minimize spatial variation in the flow distribution entering the heat exchanger when the valve door, in the duct, is near its closed position. This decrease or minimization of spatial variation can be accomplished by the mixer, such as in the form of teeth, and the upstream valve door edge where the flow passes the valve door.

Also, the present invention can decrease or minimize temporal gradients in flow distribution as the valve door opens and closes. This can be accomplished by shaping the mixer such that there is a continuous increase, such as a linear increase, in flow area as the valve door opens.

By virtue of the mixer and rounded downstream edge of the valve door, the present invention can break up a large vortex that can otherwise exist downstream of or behind the valve door. A large vortex can amplify flow starved regions on the heat exchanger face when the valve door is near its closed position. Further, the downstream edge of the valve door of the present invention can increase or maximize a width of jetted flow when the door is in its near closed position. And, the present invention can decrease or minimize pressure drop when the valve door is in its full open position.

Figure 2:
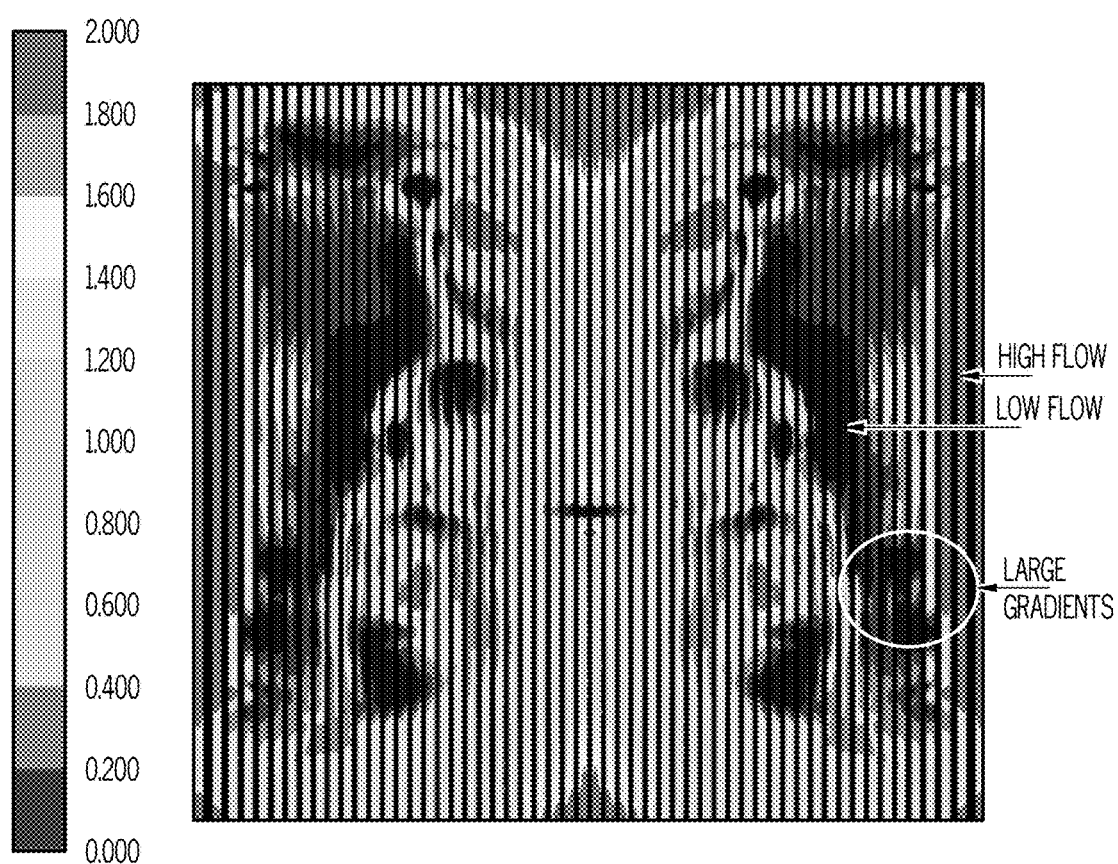
FIG. 2 depicts a flow distribution into a heat exchanger according to a prior design.

FIG. 2 depicts a heat exchanger 20 with a duct or manifold 21 that can direct a flow of air to a heat exchanger inlet or face 20a. A flow control system 22 of the present invention can be disposed in the duct 21. The heat exchanger 20 and the duct 21 can be of any conventional design.

Figure 3:
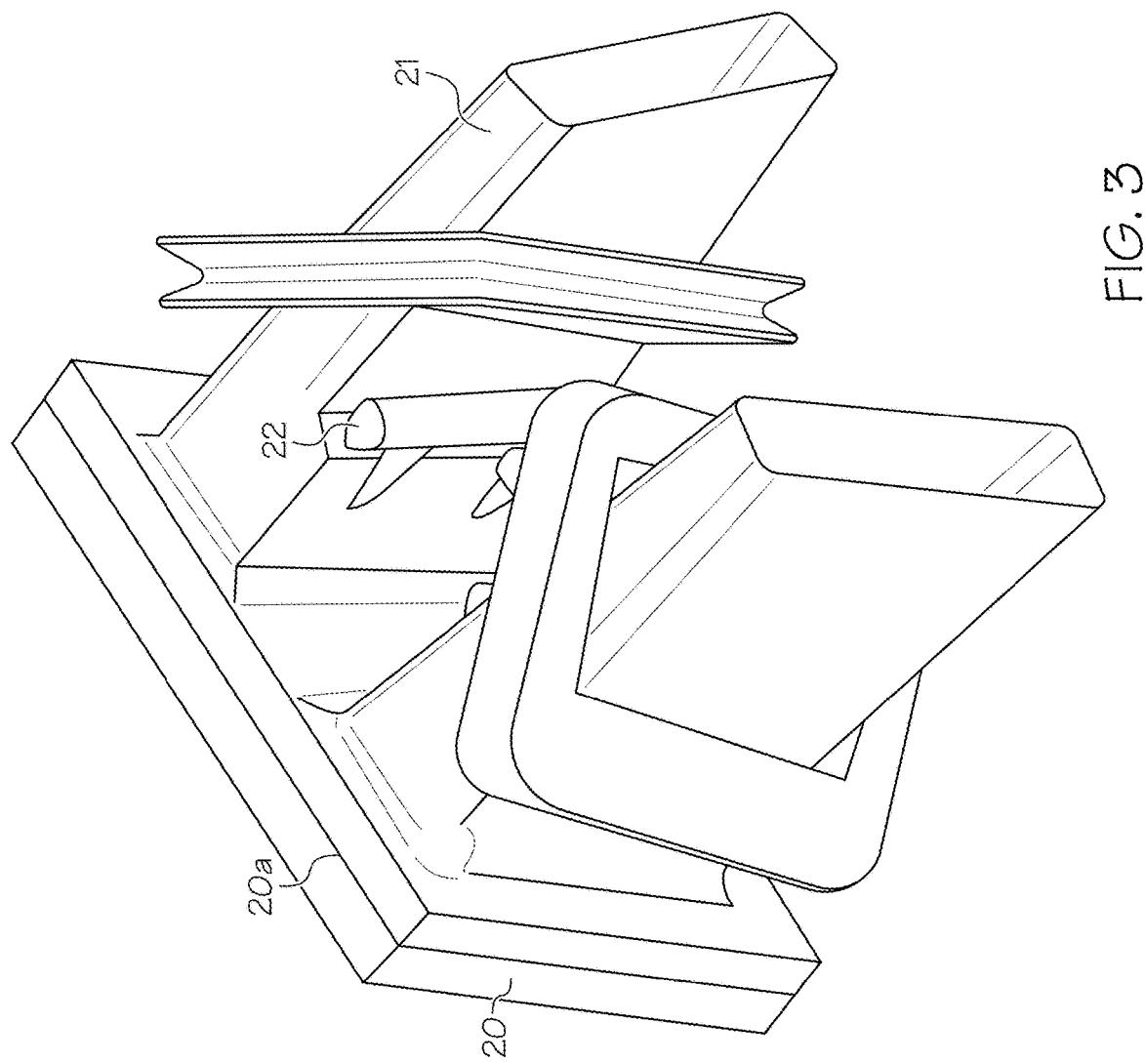
FIG. 3 is a perspective external view of a flow control system according to an embodiment of the present invention.
Figure 3A:
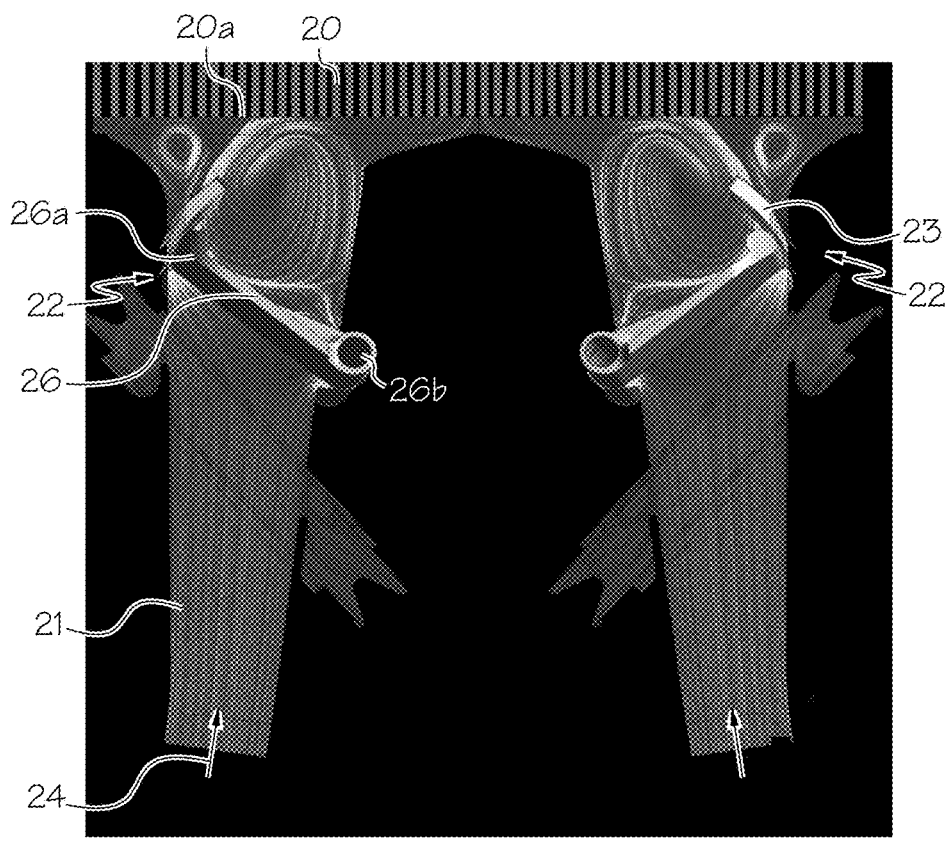
FIG. 3A is a is a side internal view of a valve door of the flow control system of FIG. 3.

FIG. 3A depicts an interior view of the duct 21 with a flow 24 flowing therein. In this embodiment, the duct 21 can have an increasing cross sectional area from where the flow 24 enters the duct 21 and towards the heat exchanger face 20a. The flow control system 22 may include a valve door 26 that may have a downstream end 26a and an upstream end 26b. The downstream end 26a can be a portion of the valve door 26 about which the flow 24 can pass the door 26. The upstream end 26b can be a portion of the valve door 26 about which the door 26 can move or pivot.

The valve door 26 can pivot between an open position and a closed position. In an open position, the valve door 26 allows flow into the heat exchanger 20. In a closed position, the valve door prevents flow into the heat exchanger.

In FIG. 3A, the valve door 26 is shown in a near closed position. In a closed position, the downstream end 26a of the valve door 26 can be in contact with an interior wall of the duct 21. In an open position, the downstream end 26a of the valve door 26 can be disposed opposite to and interfaced with a mixer 23 of the flow control system 22.

Figure 3B:
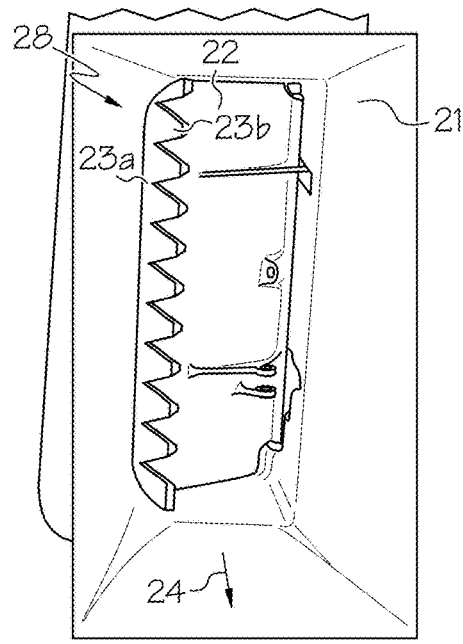
FIG. 3B is a plane internal view of a mixer of the flow control system of FIG. 3.

In FIG. 3B, the mixer 23, in embodiments, may include a plurality of mixing elements 23a and/or mixing openings 23b. In embodiments, each mixing element 23a may be disposed in an alternating arrangement with each mixing opening 23b.

FIGS. 4A-4D depict some alternative embodiments of a valve door 26 and its downstream end 26a. In general, the downstream end 26a has a non-sharp configuration, as distinguished from a square or rectangular configuration that has sharp corners. In embodiments, all or at least a portion of the downstream end 26a can have a rounded configuration or a smooth, rounded surface.

Figure 4A:
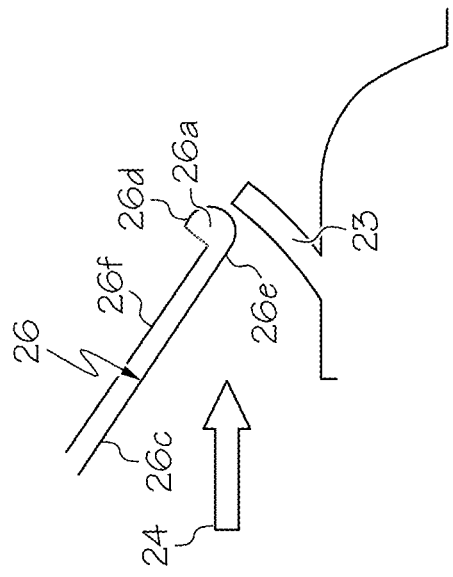
FIGS. 4A-4D depict alternate embodiments of a trailing edge of a valve door of a flow control system according to the present invention.

In FIG. 4A, the downstream end 26a includes a flat surface 26e in the same plane as an upstream surface 26c of the valve door 26. A rounded surface 26d of the downstream end 26a is opposite to the flat surface 26e and extends to a plane of the downstream surface 26f of the valve door 26.

Figure 4B:
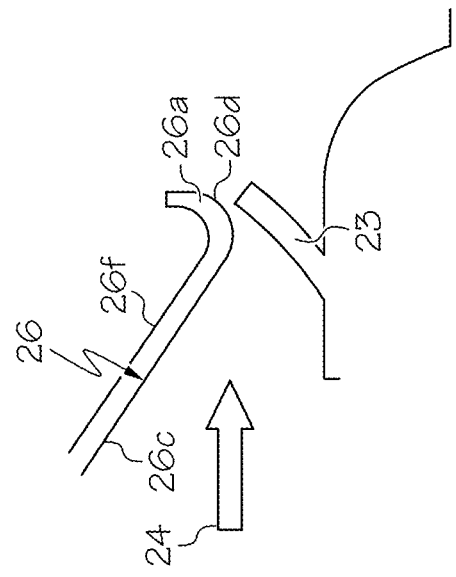

In FIG. 4B, the downstream end 26a includes a flat surface 26e in the same plane as an upstream surface 26c of the valve door 26. A rounded surface 26d of the downstream end 26a is opposite to the surface 26e and extends towards but not up to a downstream surface 26f of the valve door 26.

Figure 4C:
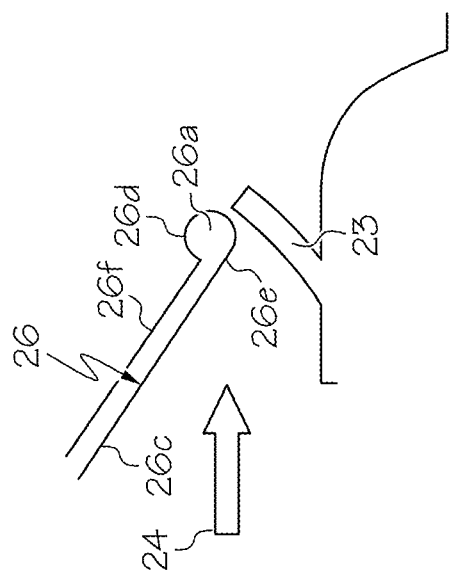

In FIG. 4C, the downstream end 26a includes a flat surface 26e in the same plane as an upstream surface 26c of the valve door 26. A rounded surface 26d of the downstream end 26a, in combination with the flat surface 26e, is in the form of a complete J-hook.

Figure 4D:
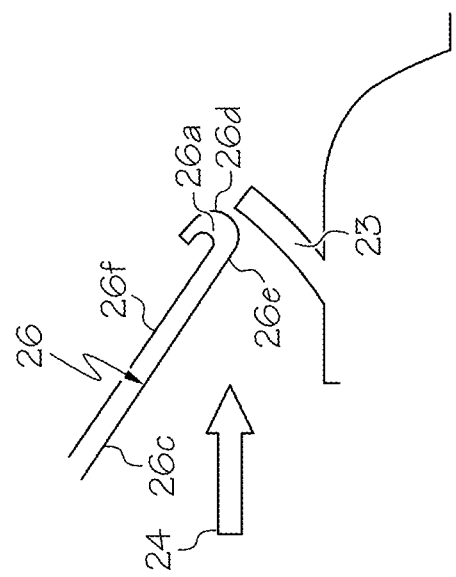
Figure 5C:
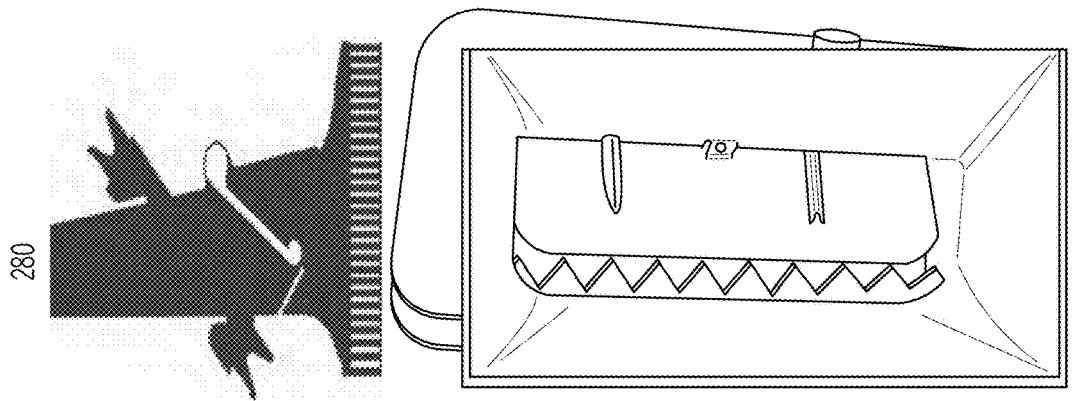
Figure 5B:
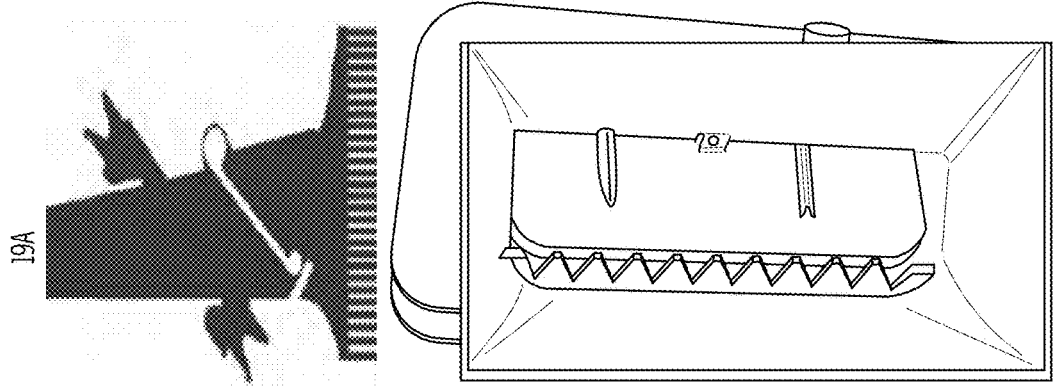
Figure 5A:
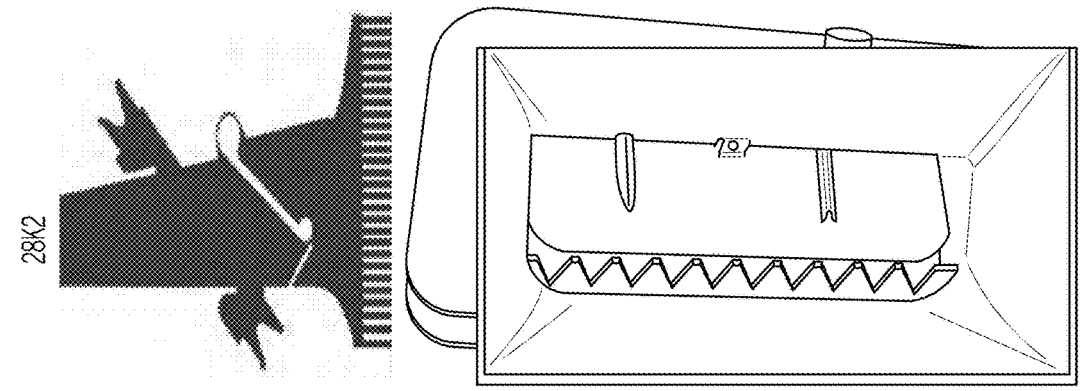

In FIG. 4D, the downstream edge 26a omits a flat surface in the same plane as an upstream surface 26c of the valve door 26. A rounded surface 26d of the downstream end 26a is in the form of a partial J-hook.

FIGS. 5A-5E depict some alternative embodiments of mixer 23 which, for exemplary purposes, are in the form of alternating teeth and openings. In FIGS. 5A-5E, the teeth and openings vary in shape, length, thickness, spacing, as well as gap between the valve door and mixer.

FIG. 6 depicts a front elevational view of a mixer 23 according to an embodiment. The mixer 23 may have a distal section 23-1 and a base section 23-2. In embodiments, the distal section 23-1 may represent a "top" section that interfaces the valve door 26 when it moves between a near closed position 28 and a partially open position 29. The base section 23-2 may represent a "bottom" section that interfaces the valve door 26 when it moves between a closed position 27 and the near closed position 28.

In the embodiment of FIG. 6, one or more mixing elements 23a may have a distal portion 23a-1 and a base portion 23a-2. One or more mixing openings 23b may have a distal portion 23b-1 and a base portion 23a-2. In embodiments the distal portions 23a-1, 23b-1 of the mixing elements and openings may be positioned in the distal section 23-1 of the mixer, and/or the base portions 23a-2, 23b-2 of the mixing elements and openings may be positioned in the base section 23-2.

As shown in FIG. 6, one or more of the distal portions 23a-1 of the mixing elements may have a width which is less than a width of one or more of the base portions 23a-2 of the mixing elements. Likewise, one or more of the distal portions 23b-1 of the openings may have a width which is greater that a width of one or more of the base portions 23b-2 of the openings.

Although FIG. 6 depicts each mixing element 23a to be of the same configuration, the present invention includes different configurations for one or more mixing elements. Similarly, even though each mixing opening 23b is depicted to be of the same configuration, the present invention includes different configurations for one or more mixing openings.

One or more of the mixing openings 23b can be defined by two opposing walls 23c. The walls 23c may be non-parallel to one another and disposed, relative to one another at an angle 23d which can be less than 90°. The angle 23d may the same or different for each opening 23b.

FIG. 6 depicts valve door 26 position relative to the mixer 23 as the door moves between closed and partially open positions. When the valve door 26 is closed, its position can be denoted as position V1. In such position, there is zero flow area and no flow passes the door 26. When the valve door 26 is in a near closed position, denoted as V2, there is a sub-flow area V2-a in mixing opening 23b that is greater than zero to enable flow to pass the door 26. When the valve door 26 is in a partially open position, denoted as V3, there is a sub-flow area V3-a in mixing opening 23b and/or in the area above opening 23b that is greater than the flow area V2-a. Accordingly, the distal section 23-1 and/or the base section 23-2 of the mixer, and in particular, the one or more mixing openings 23b, can provide a continuous, non-linearly (i.e., non-constant) increasing flow area (that includes sub-flow areas) as the door moves from a closed position to a partially open position. In other words, the flow area may be a non-linearly increasing flow area because the walls 23c are non-parallel to each other. Thus, as an example, the flow area may increase quadratically. In another example, as the downstream end of the door moves from a closed position to a partially open position, the flow area can increase according to the following equations:

Area(theta)=0; for theta<THETA1

Area(theta)=$K1$(theta−THETA1)+$K2$(theta−THETA1)$^2$;

for theta>THETA1;$K1$ and $K2$ constant

Notwithstanding the foregoing, the present invention contemplates that one or more of the mixer openings provide a flow area other than a continuously increasing flow area. For example, one or more openings may provide a fixed flow area.

Figure 1:
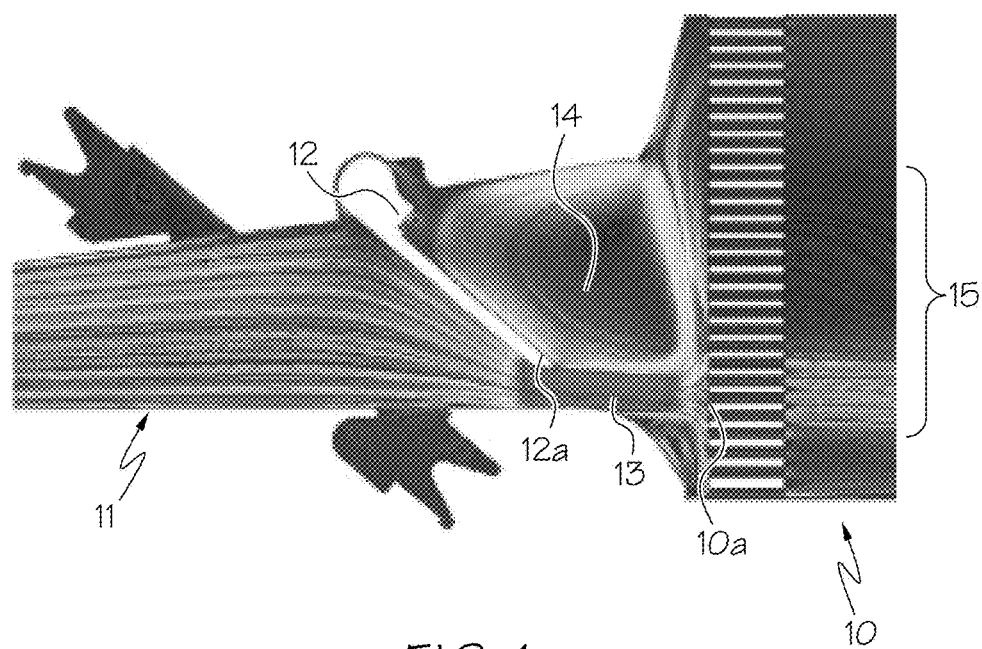
FIG. 1 is a side view of a heat exchanger and duct/manifold according to a prior design.
Figure 7:
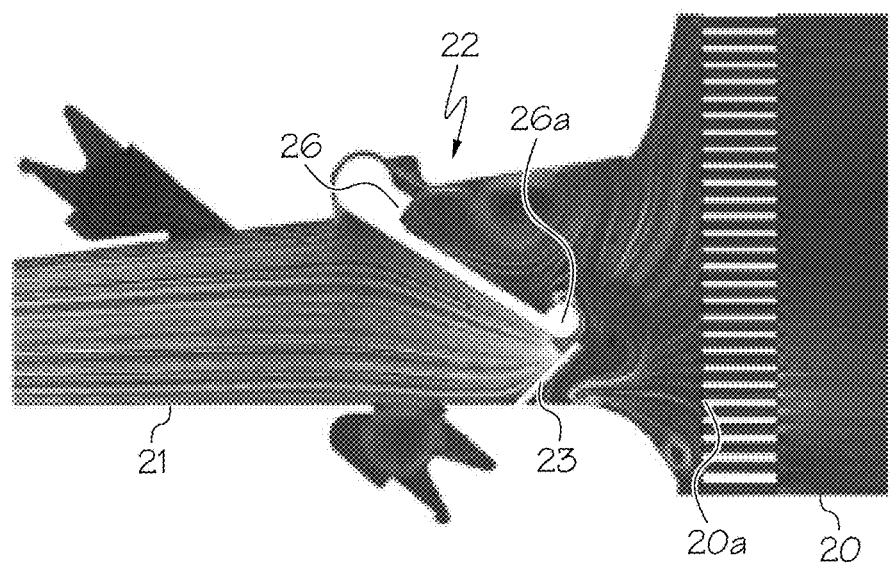
FIG. 7 is a side view of a flow control system and flow distribution according to an embodiment of the present invention.

FIG. 7 depicts a side view of the flow control system 22 including the mixer 23 and the downstream end 26a of the valve door. Upon the flow passing the door 26 and the mixer 23, the flow enters the inlet or entrance 20a of the heat exchanger 20. When comparing FIG. 7 to FIG. 1 (prior art), it can be seen that the jetted flow 13 in FIG. 1 is decreased, minimized and/or eliminated in FIG. 7. Also, it can be seen that the vortex 14 in FIG. 1 is decreased, minimized and/or eliminated in FIG. 7. And the spatial gradient 15 in FIG. 1 is decreased, minimized and/or eliminated in FIG. 7.

Figure 8:
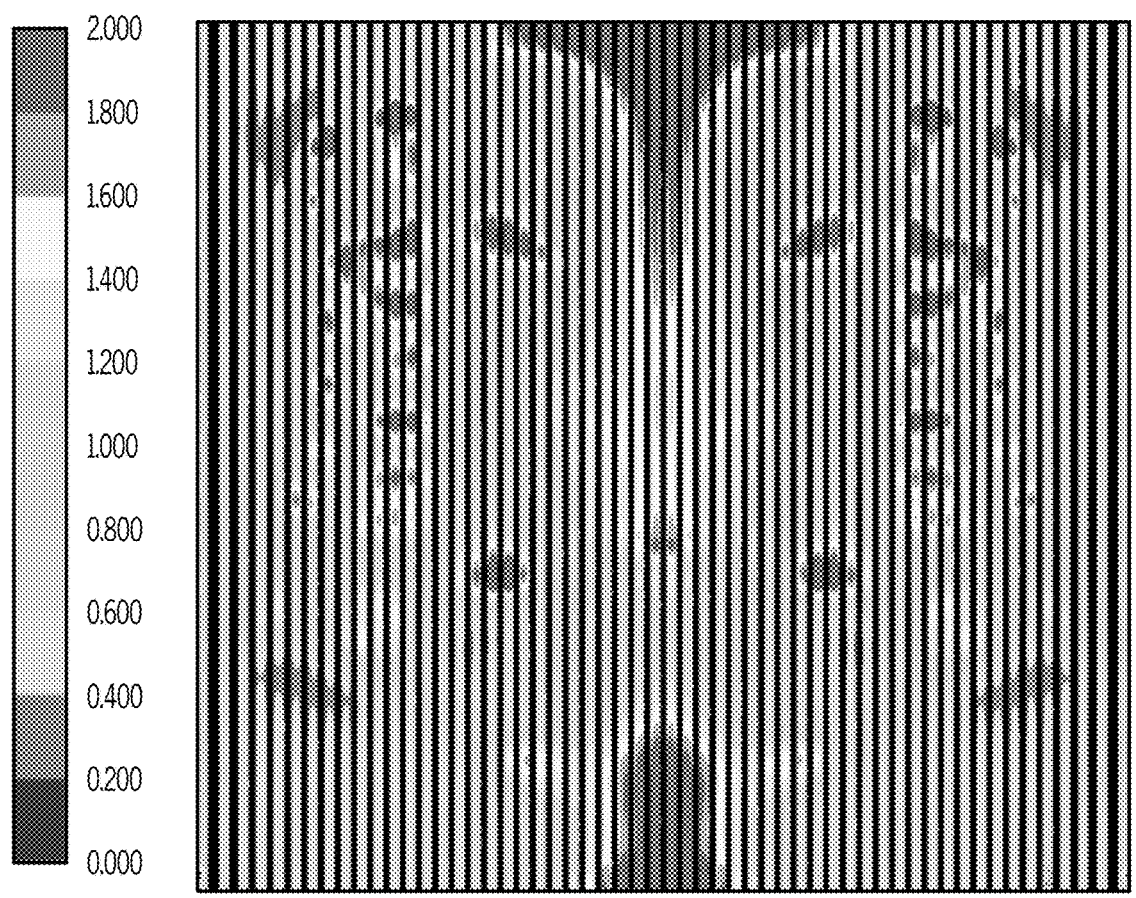
FIG. 8 depicts a flow distribution into a heat exchanger according to an embodiment of the present invention.

FIG. 8 depicts a flow distribution entering a heat exchanger when using the flow control system 22. When comparing FIG. 8 to FIG. 2 (prior art), it can be seen that the high flow in FIG. 1 is decreased, minimized and/or eliminated in FIG. 8. Also, it can be seen that the low flow in FIG. 1 is decreased, minimized and/or eliminated in FIG. 7. And the large gradient in FIG. 1 is decreased, minimized and/or eliminated in FIG. 8.

Without intending to limit the scope of the present invention, embodiments, and in particular the downstream end, can decrease separation of the flow from the valve door, and can increase diffusion of the flow past the valve door. Further, embodiments, and in particular the mixer, can provide a continuous increase in flow area, decrease temporal flow gradients such as when the door is near a closed position, and decrease spatial flow gradients at the inlet of the heat exchanger.

It should be understood, of course, that the foregoing relates to exemplary embodiments of the invention and that modifications may be made without departing from the spirit and scope of the invention as set forth in the following claims.

We claim:

1. A flow control system in an inlet duct to a heat exchanger, wherein the inlet duct has an interior surface, the system comprising:
a door having a first end and a second end opposite the first end;
wherein the first end rotates about an axis;
wherein the second end moves between an open position and a closed position to respectively allow and prevent flow into the heat exchanger;
wherein the second end has a rounded configuration;
a mixer having a curved inlet facing surface that extends, in a height-wise direction, away from the interior surface of the inlet duct;
wherein the inlet facing surface is disposed so that the second end of the door moves opposite to and along an entire height of the inlet facing surface;
wherein the mixer includes a plurality of mixing elements downstream of the door;
wherein each of the mixing elements is disposed in a single linear row;
wherein at least one mixing element has a base portion and a distal portion;
wherein the base portion has a base width and the distal portion has a distal width; and
wherein the base width is wider that the distal width.

2. The system of claim 1, wherein the second end includes a smooth rounded surface.

3. The system of claim 1, wherein the plurality of mixing elements include a plurality of teeth.

4. The system of claim 1, wherein the plurality of mixing elements include a plurality of non-parallel walls.

5. The system of claim 1, further comprising a plurality of mixing openings among the plurality of mixing elements.

6. The system of claim 1, wherein the plurality of mixing elements provide a non-constant flow area as the second end moves from the closed position and towards the open position.

7. A flow control system in an inlet duct to a heat exchanger, wherein the inlet duct has an interior surface, the system comprising:
a door having a downstream end where a flow in the inlet duct enters the heat exchanger;
wherein the downstream end moves between an open position and a closed position to respectively allow and prevent flow into the heat exchanger;
wherein the downstream end has a smooth, rounded surface;
wherein the downstream end decreases separation of the flow from the door;
wherein the downstream end increases diffusion of the flow past the door; and
a mixer downstream of the door; and
wherein the mixer includes a non-linearly increasing flow area having mixing openings that are disposed outside of, and not in, the interior surface of the inlet duct;
wherein the mixer includes a curved inlet facing surface that extends away from the interior surface of the inlet duct;
wherein the inlet facing surface is disposed so that the downstream end of the door moves opposite to and along an entire height of the inlet facing surface;
wherein the mixer includes a plurality of mixing elements downstream of the door;
wherein each of the mixing elements is disposed in a single linear row.

8. The system of claim 7, wherein the downstream end includes a flat surface.

9. The system of claim 7, wherein:
the door includes an upstream surface and a downstream surface; and
the rounded surface extends towards and contacts the downstream surface.

10. The system of claim 7, wherein:
the door includes an upstream surface and a downstream surface; and
the rounded surface extends towards but does not contact the downstream surface.

11. The system of claim 7, wherein the downstream end is in the form of a J-hook.

12. The system of claim 7, wherein the downstream end is in the form of a partial J-hook.

13. The system of claim 7, wherein the mixer includes alternating mixing elements and mixing openings.

14. The system of claim 7, wherein the flow area is continuously increasing as the downstream end moves from the closed position and towards the open position.

15. A flow control system in an inlet duct to a heat exchanger, comprising:
- a door having a downstream end where a flow in the inlet duct enters the heat exchanger;
- wherein the downstream end moves between an open position and a closed position to respectively allow and prevent flow into the heat exchanger;
- a mixer downstream of the door;
- wherein the mixer includes a curved inlet facing surface that extends away from an interior surface of the inlet duct;
- wherein the inlet facing surface is disposed so that the downstream end of the door moves opposite to and along an entire height of the inlet facing surface;
- wherein the mixer has a plurality of alternating mixing elements and mixing openings;
- wherein each of the mixing elements is disposed in a single linear row;
- wherein the flow passes through the mixing openings;
- wherein the mixing elements are disposed outside of, and not in, the interior surface of the inlet duct;
- wherein at least one mixing opening has a base portion and a distal portion;
- wherein the at least one mixing opening:
  - provides a non-linearly increase in flow area from the base portion to the distal portion;
  - decreases temporal flow gradients when the door is near the closed position; and
  - decreases spatial flow gradients at an inlet of the heat exchanger.

16. The system of claim 15, wherein the mixer includes a plurality of teeth.

17. The system of claim 15, wherein the mixer includes a plurality of sub-flow areas.

18. The system of claim 15, wherein the flow area is a quadratically increasing flow area.

* * * * *